July 3, 1951    J. H. HELLING    2,559,299
CONVEYING DEVICE

Filed Dec. 18, 1946    3 Sheets-Sheet 1

INVENTOR
JOHANNES H. HELLING
By:
Haseltine, Lake & Co.
AGENTS

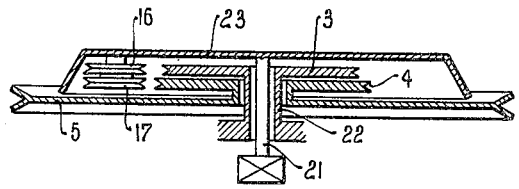
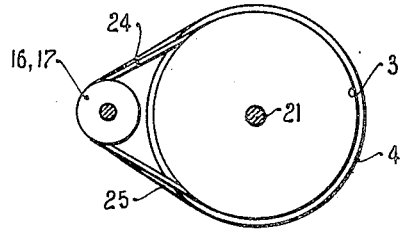
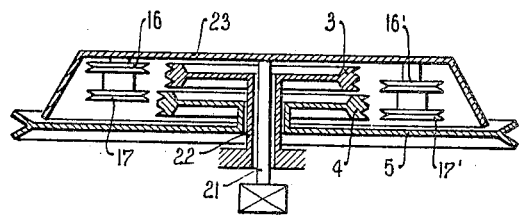
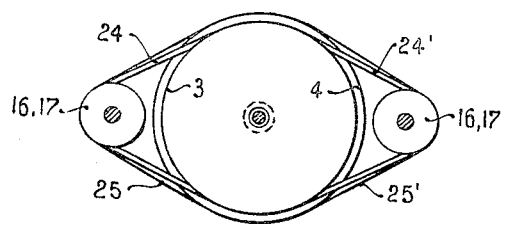

July 3, 1951    J. H. HELLING    2,559,299
CONVEYING DEVICE
Filed Dec. 18, 1946    3 Sheets-Sheet 3
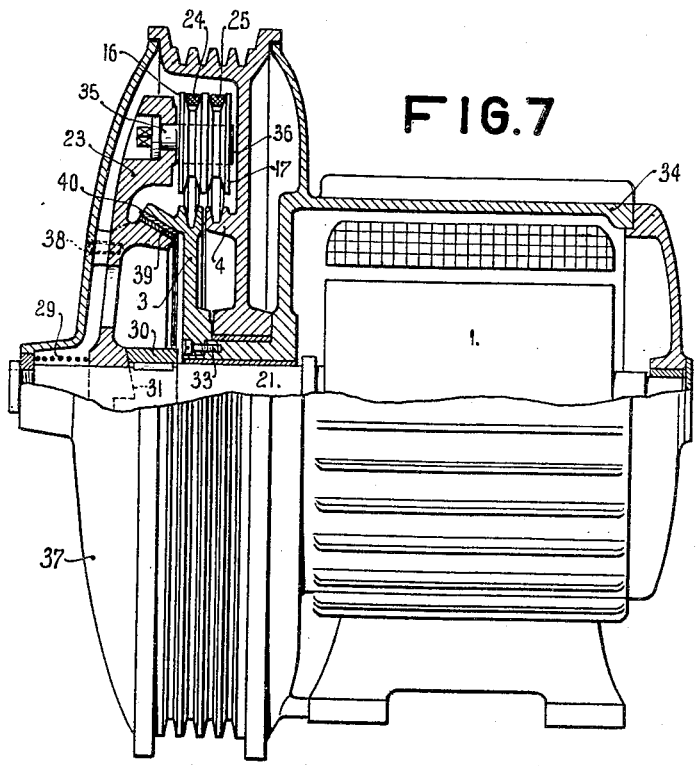
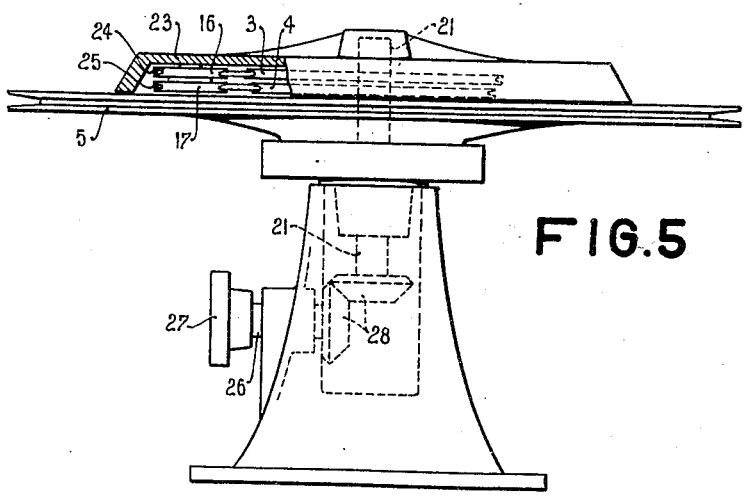
INVENTOR
JOHANNES H. HELLING
BY:
Haseltine, Lake & Co.
AGENTS Patented July 3, 1951

2,559,299

UNITED STATES PATENT OFFICE 2,559,299

CONVEYING DEVICE

Johannes H. Helling, Rotterdam, Netherlands

Application December 18, 1946, Serial No. 716,982
In the Netherlands June 17, 1946

8 Claims. (Cl. 74—217)

This invention relates to a conveying device driven by a cable-pulley and is particularly concerned with elevators and like hoisting apparatus.

In such a hoisting apparatus a reduction gear should usually be provided between the cable-pulley and the driving engine or motor for transmitting the engine speed to the cable-pulley in reduced ratio. The tooth gears and worm gears provided for said purpose have to be machined and mounted with great exactness as they otherwise do not operate noiseless and generate vibrations.

The invention has for its object to obtain a reduction gear which is simple and by means of which every desired reduction ratio may be obtained. According to the invention the gear to this end comprises two pulleys rotating with different circumferential speeds and mounted coaxially to each other and coupled with each other by means of one or more endless transmitting elements which run about rollers carried by a member rotatably supported coaxially to both said pulleys. With said arrangement the angular velocity of the cable-pulley depends on the difference between the circumferential speeds of both coaxial pulleys so that every desired conveying speed may be obtained independently of the number of revolutions of the driving engine or motor.

In a suitable embodiment of the gear according to the invention both coaxial pulleys are mounted on either side of the cable-pulley and are rotating with different circumferential speeds opposite to each other. With this embodiment two rollers are mounted in the body of the cable-pulley on axes extending in radial direction and over said rollers an endless belt is passed which runs from one of the rollers along the opposite front faces of both coaxial pulleys on the other roller and is gripped by pins or projections of the pulleys or by friction.

In another convenient embodiment one of the coaxial pulleys is united with the cable-pulley and the member carrying the rollers is secured to the driving shaft.

The invention will be described with reference to the accompanying drawings, in which:

Fig. 4 is a schematic longitudinal section of a gear for a horizontally mounted cable-pulley.

Fig. 5 is a constructional form of the gear shown in Fig. 4, partly in side elevation and partly in section.

Fig. 6 is a schematic longitudinal section of a modified embodiment of the gear according to Fig. 4 in which two pairs of rollers are provided and Fig. 6a shows in plan view how the ropes are trained over the pulleys and the rollers.

Fig. 7 is partly a longitudinal section and partly a side elevation of a gear corresponding to the embodiment of Fig. 4 and having the casing of the driving motor integral with the gear casing.

Fig. 8 is a plan view showing how the ropes are trained over the pulleys and rollers in the gears according to Figs. 4, 5 and 7.

Figure 1:
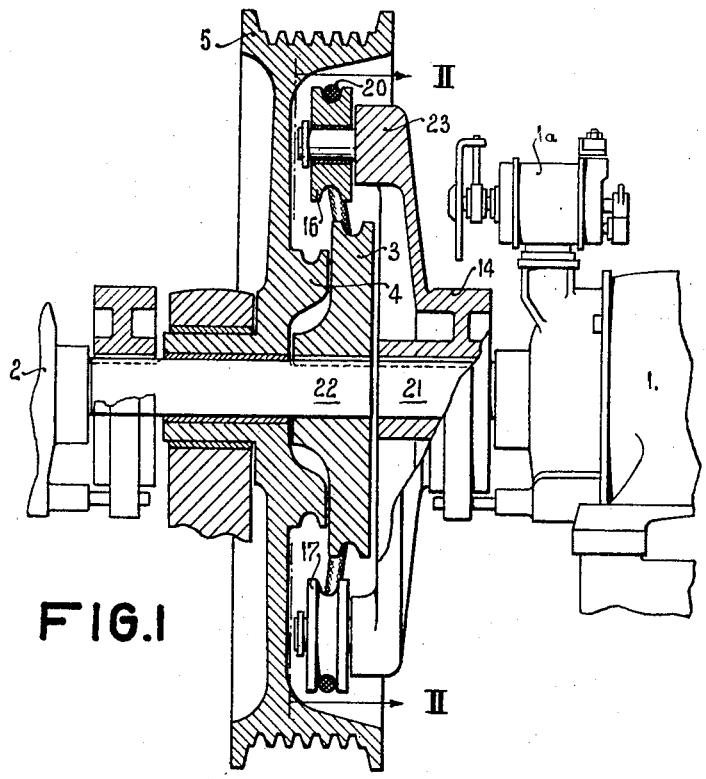
Fig. 1 is a part of longitudinal section of an embodiment of the reduction gear according to the invention.
Figures 2, 3:
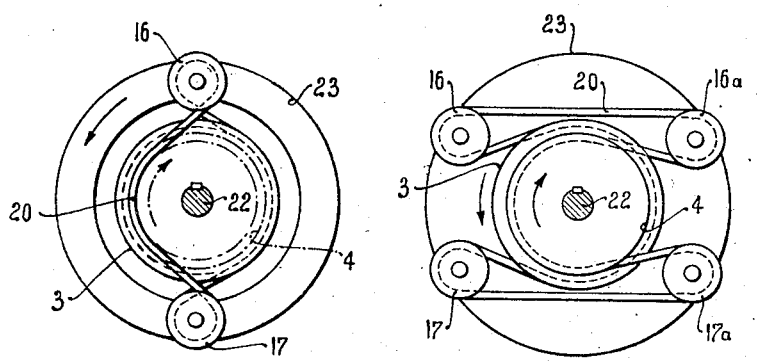
Fig. 2 is a schematic cross sectional view of the gear along the line II—II in Fig. 1.
Fig. 3 is a similar view as Fig. 2 of a gear provided with two pairs of rollers.

The embodiment shown in Figs. 1 and 2 is particularly adapted for only one driving motor 1. In the prolongation of the shaft 21 of said driving motor 1 a second shaft 22 extends which may be stationary and carries the pulley 3 which is rigid therewith. The cable-pulley 5 is freely rotatable on the shaft 22 and united with the pulley 4. The diameter of pulley 4 is somewhat smaller than that of pulley 3.

Secured to shaft 21 is a disc 23 which has a greater diameter than the coaxial pulley 3 and carries near its circumference two opposite axially directed pins on each of which a roller 16 and 17 respectively provided with a groove is rotatably mounted. An endless rope 20 runs on both said rollers 16, 17 and from the parts of the rope extending between the rollers the one runs in the groove of pulley 3 and the other in the groove of pulley 4. When the motor is running the pulley 3 and also the cable-pulley 5 rotate in opposite directions with a circumferential speed which is dependent on the difference between the diameters of the pulleys 3, 4. If said difference is reduced to zero the cable-pulley 5 remains at rest.

The shaft 22 of pulley 3 may also be connected with a second driving motor 2. In this instance the motor 2 may be used as adjusting motor for stopping the car of the elevator exactly when reaching the desired floor. If namely the supply of current to motor 1 is interrupted and the motor 2 is still running the cable-pulley 5 and therefore also the car is very gradually decelerated so that the car can be stopped exactly at the desired place.

Instead of cross-wise the belt 20 may also be passed in the form of a rhomb on the rollers 16, 17 and the pulleys 3, 4 but said arrangement presents the disadvantage over that shown in Fig. 2 that the contacting-arc between the rope and the pulleys is much smaller. In order to further still the engagement between the rope and the pulleys the disc 23 may be provided with two pairs of rollers 16, 16a and 17, 17a respectively as shown in Fig. 3. It is also possible to use two or more parallel ropes.

The embodiment shown in Fig. 4 is particularly adapted for driving a substantially horizontal haulage rope. With this embodiment the pulley 3 is secured on a fixed tubular shaft 22 which surrounds the driving shaft 21 of disc 23. The rollers 16, 17 are coaxial to each other and rotatably mounted on a common pin secured to disc 23. The roller 16 is by means of a rope 24 (Fig. 8) connected to the stationary pulley 3 and the roller 17 is by means of a second rope 25 connected to the pulley 4 united with the cable-pulley 5.

Fig. 5 shows the constructional form of the arrangement which is schematically illustrated in Fig. 4. The reference numeral 24 indicates the rope of roller 16 and 25 that of roller 17. The shaft 21 of the disc 23 carrying the rollers 16, 17 is driven through the intermediary of a bevel gearing 28 by the shaft 26 which is provided with a flange 27 enabling to couple the shaft with a driving engine or motor.

As appears from Figs. 6 and 6a more than one roller 16, 16' and more than one roller 17, 17' may be provided and with this arrangement the pulleys 3, 4 have correspondingly more than one groove.

Rope 24 connects roller 16 to pulley 3 and rope 24' connects roller 16' to pulley 3. Rope 25 connects roller 17 to pulley 4 and rope 25' connects roller 17' to pulley 4.

Fig. 7 shows an embodiment similar to that of Figs. 4 and 5 in which the casing of the driving motor is integral with the gear casing and which is particularly adapted for elevators or lifts. The disc 23 carrying the rollers 16, 17 is freely rotatable and slidably mounted on the shaft 21 of rotor 1 and loaded by a spring 29 which urges the coupling teeth 31 of the disc into engagement with corresponding teeth of a sleeve 30 keyed to shaft 21. Pulley 3 by means of screws 33 is secured to motor casing 34.

The rollers 16, 17 are journaled on an eccentric portion 36 of pin 35 secured in the disc 23 in order to tension the ropes 24, 25 by rotating pin 35.

A covering disc 37 by means of screws 38 is secured to disc 23. As soon as current is supplied to the motor the rotor 1 thereof is slid to the left so that the braking surface 39 of disc 23 comes out of engagement with a corresponding braking surface 40 and the cable-pulley 5 may be set into rotation. If the supply of current to the motor is interrupted the brake 39, 40 is automatically engaged in order to lock the cable pulley against rotation.

It is to be noted that the invention is not restricted to the above described embodiments as instead of using pulleys 3, 4 of different diameters also rollers 16, 17 of different diameters may be provided.

What I claim is:

1. In a conveying device comprising a driven cable-pulley and a driving shaft the provision of a reduction gear between said cable-pulley and the driving shaft, said reduction gear comprising two pulleys mounted coaxially with respect to the driving shaft, one of said coaxial pulleys being rotatable with respect to the other and secured to the cable-pulley and a member carrying at least two rollers being secured to the driving shaft, the axis of said rollers extending parallel to the driving shaft and said rollers being coupled to the coaxial pulleys by means of at least one endless transmitting element.

2. In a conveying device comprising a driven cable-pulley and a driving shaft the provision of a reduction gear between said cable-pulley and the driving shaft, said reduction gear comprising two pulleys mounted coaxially with respect to the driving shaft, one of said coaxial pulleys being secured to the cable-pulley and the other pulley being stationary, a member carrying at least two rollers being secured to the driving shaft, the axis of said rollers extending parallel to the driving shaft and said rollers being coupled to the coaxial pulleys by means of at least two endless transmitting elements.

3. In a conveying device comprising a driven cable-pulley and a driving shaft the provision of a reduction gear between said cable-pulley and the driving shaft, said reduction gear comprising two pulleys rotatably mounted with respect to each other and coaxially to the driving shaft, one of said coaxial pulleys being secured to the cable-pulley and the other pulley being connected to a second driving element, a member carrying at least two rollers being secured to the driving shaft, the axis of said rollers extending parallel to the driving shaft and said rollers being coupled to the coaxial pulleys by means of at least one endless transmitting element.

4. In a conveying device comprising a driven cable-pulley and a driving shaft the provision of a reduction gear between said cable-pulley and the driving shaft, said reduction gear comprising two pulleys mounted coaxially with respect to the driving shaft, one of said coaxial pulleys being secured to the cable-pulley and a member carrying at least one pair of rollers being secured to the driving shaft, said pair of rollers being rotatably journalled on a common pin secured to said member and extending parallel to the driving shaft, said rollers being coupled to the coaxial pulleys by means of endless transmitting elements.

5. In a conveying device comprising a driven cable-pulley and a driving shaft the provision of a reduction gear between said cable-pulley and the driving shaft, said reduction gear comprising two pulleys mounted coaxially to the driving shaft, one of said coaxial pulleys being secured to the cable-pulley and a member carrying pairs of rollers being secured to the driving shaft, each pair of rollers being rotatably journalled on a common pin secured to said member and extending parallel to the driving shaft, and one roller of each pair being coupled to one of the coaxial pulleys, and the other roller of the pair to the other of said pulleys each by an individual endless transmitting member.

6. In a conveying device comprising a driven cable-pulley and a driving shaft the provision of a reduction gear between said cable-pulley and the driving shaft, said reduction gear comprising two pulleys mounted coaxially with respect to the driving shaft, one of said coaxial pulleys being secured to the cable-pulley and the other being stationary and a member carrying at least one pair of rollers being secured to the driving shaft, said pair of rollers being rotatably journalled on an eccentric portion of a common pin secured to said member and extending parallel to the driving shaft, said rollers being coupled to the coaxial pulleys by means of endless transmitting elements.

7. In a conveying device comprising a driven cable-pulley and a driving shaft the provision of a reduction gear between said cable-pulley and the driving shaft, said reduction gear comprising two pulleys mounted coaxially with respect to the driving shaft, one of said coaxial pulleys being secured to the cable-pulley and a member carrying at least two rollers being secured to the driving shaft and provided with a braking surface cooperating with a stationary braking surface, the axis of said rollers extending parallel to the driving shaft and said rollers being coupled to the coaxial pulleys by means of at least two endless tranmitting elements.

8. In a conveying device comprising a driven cable-pulley and a driving shaft the provision of a reduction gear between said cable-pulley and the driving shaft, said reduction gear comprising two pulleys mounted coaxially with respect to the driving shaft, one of said coaxial pulleys being secured to the cable-pulley and the other pulley being stationary, a member carrying at least two rollers being secured to the driving shaft and provided with a braking surface cooperating with a braking surface provided on the stationary coaxial pulley, the axis of said rollers extending parallel to the driving shaft and said rollers being coupled to the coaxial pulleys by means of at least two endless transmitting elements.

JOHANNES H. HELLING.

REFERENCES CITED

The following references are of record in the file of this patent:

UNITED STATES PATENTS

| Number | Name | Date |
| --- | --- | --- |
| 436,970 | Edison | Sept. 23, 1890 |